United States Patent [19]

Tilby

[11] Patent Number: 5,122,380
[45] Date of Patent: Jun. 16, 1992

[54] RIND-FREE SUGARCANE FLOUR AND METHOD FOR MAKING FLOUR

[76] Inventor: Sydney E. Tilby, 989 Wagonwood Drive, Victoris, British Columbia, Canada, V8X 4M1

[21] Appl. No.: 637,361

[22] Filed: Jan. 4, 1991

[51] Int. Cl.⁵ ............................................. A23L 1/212
[52] U.S. Cl. ................................... 426/622; 426/640
[58] Field of Search ................... 426/550, 622, 640

[56] References Cited

U.S. PATENT DOCUMENTS

| | | | |
|---|---|---|---|
| 707,113 | 8/1902 | Hughes . | |
| 2,888,348 | 5/1959 | Fuentes | 426/53 |
| 3,424,611 | 1/1969 | Miller | 127/2 |
| 3,424,612 | 1/1969 | Miller | 127/2 |
| 3,566,944 | 3/1971 | Tilby | 426/518 |
| 3,567,510 | 12/1967 | Tilby | 99/2 ND |
| 3,567,511 | 3/1968 | Tilby | 127/2 |
| 3,698,459 | 10/1972 | Tilby | 127/25 |
| 3,721,567 | 3/1973 | Miller et al. . | |
| 3,767,424 | 10/1973 | Shimizu | 426/640 |
| 3,796,809 | 3/1974 | Miller et al. | 426/2 ND |
| 3,873,033 | 3/1975 | Tilby | 127/2 |
| 3,939,286 | 2/1976 | Jelks | 426/74 |
| 3,976,499 | 8/1976 | Tilby | 127/2 |
| 4,151,004 | 4/1979 | Vukelic | 127/2 |
| 4,241,093 | 12/1980 | Faragi | 426/640 |
| 4,312,677 | 1/1982 | Tilby | 127/2 |
| 4,451,489 | 5/1984 | Beale | 426/640 |
| 4,565,705 | 1/1986 | Snider | 426/640 |
| 4,774,098 | 9/1988 | Goulds | 426/622 |
| 4,961,952 | 10/1990 | O'Sullivan | 426/615 |

*Primary Examiner*—Carolyn Paden
*Attorney, Agent, or Firm*—Jansson & Shupe

[57] ABSTRACT

As a human foodstuff, substantially rind-free sugarcane flour made of pith separated from the sugarcane stalk. Such sugarcane flour may have some or substantially all of the natural sugar content of the pith removed in the manufacturing process to suit specific end uses.

12 Claims, No Drawings

RIND-FREE SUGARCANE FLOUR AND METHOD FOR MAKING FLOUR

FIELD OF THE INVENTION

This invention is related generally to human foodstuff and, more particularly, to flour.

BACKGROUND OF THE INVENTION

The stalk of the sugarcane plant includes a central core of pith containing sugar juice from which a variety of sugar products are made. Such pith is surrounded by an outer rind which is a hard, wood-like fibrous substance. The outer surface of the rind has a thin, waxy epidermal layer, referred to herein as "dermax."

In conventional sugarcane industry practices over many decades, sugarcane has been used primarily only for its sugar content. Such industry practices have involved chopping and crushing sugarcane stalks to remove the sugar juice, with the waste solids (bagasse) being used primarily only as fuel, often in sugarcane processing operations.

Although such practices have been virtually uniform throughout the industry, it has been recognized that a number of very useful products may be produced from sugarcane if the sugarcane stalk is first separated into its rind, pith and dermax constituents. The many useful end-products made possible by such separation can provide great economic benefit.

A description of sugarcane processing technology would be seriously lacking without mentioning the resurgence of development activity relating to sugarcane separation, including separation of pith from rind and dermax as mentioned above, which began in the 1960's. Substantially all of such activity is related to what has been known in the industry as the Tilby system, named after its principal originator, Sydney E. ("Ted") Tilby. U.S. Pat. No. 3,567,510 is but one example of numerous patents bearing his name and relating to sugarcane separation.

Even without the benefits of the Tilby system, it has been recognized that food products other than sugar may be made from sugarcane. For example, an early effort to make cattle food from sugarcane is reflected in U.S. Pat. No. 707,113 (Hughes). Such effort involved disintegrating crushed cane or straining pith out of expressed juice, then drying the product and mixing it with molasses in the ratio of about 20% pith to 80% molasses. This mixture is dried and then made into meal or a powder, either of which may be pressed into cakes for cattle food.

U.S. Pat. Nos. 3,721,567 and 3,796,809 (Miller et al.), which were issued in the names of certain collaborators with Sydney E. ("Ted") Tilby in development of the Tilby sugarcane separation concepts, describe a livestock feed made using pith separated from cane stalk with the sugar retained for high energy content. Such Miller et al. patents note that ruminants (e.g., cattle) can digest the cellulose in sugarcane pith but, since it takes more energy to digest such pith than is obtained from it, nutritive supplements are combined with the pith. Specific supplements are identified in the aforementioned Hughes and Miller et al. patents.

More recently, there have been efforts to make flour from sugarcane. Entire sugarcane stalks (including the rind, pith and dermax constituents) were finely ground and the resulting product dried to obtain a powdery flour. Such flour contained the sugar content of the stalks. The resulting flour is considered by many to be unacceptable for human consumption, for a variety of reasons. One reason is that flour which includes rind can have an adverse flavor, and raise possible toxicity concerns. More significant, however, is that the woody rind content of such flour can have an adverse effect on human digestion; in fact, it is known to have an adverse effect on digestion processes of certain animals. Such flour is also "off-color."

The prior art does not recognize that the aforementioned Tilby separation system offers the possibility of substantially rind-free sugarcane flour, and does not recognize that such flour would have significant value in human foodstuffs because of its nutritional elements and fiber content. Also, the prior art fails to recognize that sugar content of such flour may be controllably adjusted to a desired reduced level, making such flour suitable and advantageous for a wide variety of uses in the food industry.

An enduring human problem is the need for sufficient supplies of food, particularly food having good dietary characteristics. Certain areas of the world may have insufficient food but at the same time have an ability to grow high volumes of sugarcane for production of sugar. Many sugar products, while providing energy, fail to satisfy certain other requirements such as the need for dietary fiber. A huge volume of sugarcane waste is discarded or burned without any recognition of its potential usefulness for a variety of purposes, including human dietary purposes.

A flour made from substantially only the pith of sugarcane in a form useful and desirable as a human foodstuff would be a useful development for mankind. A sugarcane flour having high quality and high versatility would be an important advance in the art.

OBJECTS OF THE INVENTION

It is an object of this invention to provide a new human foodstuff having significant benefits.

Another object of this invention is to provide a flour made from sugarcane.

Another object of this invention is to provide a flour made from sugarcane overcoming some problems and shortcomings of the prior art.

Another object of this invention is to provide a versatile flour which is adaptable to a variety of food industry uses.

Yet another object of this invention is to provide a sugarcane flour which is white in color.

These and other important objects will be apparent from the descriptions of this invention which follow.

SUMMARY OF THE INVENTION

This invention is a human foodstuff which is substantially rind-free sugarcane flour, and a method for manufacturing a dietary flour for specific end uses. The flour of this invention is made of pith separated from the sugarcane stalk.

To make the flour of this invention, sugarcane pith which has been separated from the sugarcane rind and dermax is dried and then ground in a hammer mill, or other type of impact grinder, after the sugar level of the pith has been selected. To set the sugar content at maximum levels, sugar extraction processes by which sugar juice is removed from pith are by-passed. Alternatively, the sugar level may be adjusted downwardly by the extent to which extraction processes are applied.

The sugarcane flour of this invention may be made with the sugar content of the pith partially or substantially entirely removed.

The human foodstuff of this invention may be a sugarcane flour of the type described blended together with grain flour, such as wheat flour. For example, in a preferred form such foodstuff may have at least 50% grain flour by weight, most preferably at least 80%. In one example, about 90% of the flour blend is a grain flour, with the balance substantially rind-free sugarcane flour as described.

Sugarcane flour, including the aforementioned blends, is important as a human foodstuff for several reasons. One is that such flour (with some or all of the natural pith sugar) be used to make bread of the leavened or unleavened type without the separate addition of sugar or at least as much sugar as is common. And, irrespective of the amount of natural sugar maintained in the manufacturing process, its high fiber content makes it valuable as a human foodstuff.

The human foodstuff of this invention may be made in the following manner:

First, sugarcane pith is separated from the sugarcane stalk in a manner obtaining substantially rind-free pith. While there are several ways to separate such pith from other stalk components, separated pith obtained by the Tilby system is preferred since it is substantially rind-free.

Broadly speaking, the Tilby system involves a multi-step operation executed by various portions of a cane separator machine. Sugarcane billets, i.e., cut lengths of cane stalk preferably about 25-35 cm long, are driven downwardly over a splitter to divide them lengthwise into semi-cylindrical half billets. The two half billets of a split billet are then processed individually by symmetrical downstream portions of the separator machine.

The first of such downstream portions of the separator is a depithing station which includes a cutter roll and holdback roll for milling pith away from the rind of the half-billet while simultaneously flattening the rind. This milled pith is the product used for production of the flour of this invention. The pith is conveyed away from the separator machine to an extraction station where its sugar juice is removed.

A significant number of patents related to the Tilby system and improvements in such system have been granted, beginning in the 1960's. These and other fairly recent U.S. Pat. Nos. related generally to sugarcane processing are as follows:

U.S. Pat. No. 3,424,611 (Miller)
U.S. Pat. No. 3,424,612 (Miller)
U.S. Pat. No. 3,464,877 (Miller et al.)
U.S. Pat. No. 3,464,881 (Miller et al.)
U.S. Pat. No. 3,566,944 (Tilby)
U.S. Pat. No. 3,567,510 (Tilby)
U.S. Pat. No. 3,567,511 (Tilby)
U.S. Pat. No. 3,690,358 (Tilby)
U.S. Pat. No. 3,698,459 (Tilby)
U.S. Pat. No. 3,721,567 (Miller et al.)
U.S. Pat. No. 3,796,809 (Miller et al.)
U.S. Pat. No. 3,873,033 (Tilby)
U.S. Pat. No. 3,976,498 (Tilby)
U.S. Pat. No. 3,976,499 (Tilby)
U.S. Pat. No. 4,025,278 (Tilby)
U.S. Pat. No. 4,151,004 (Vukelic)
U.S. Pat. No. 4,312,677 (Tilby et al.).

Another advantage of using the Tilby system to separate pith from rind is that such system chops and mixes together the short-fiber pith cells and the long-fiber vascular bundles to which such pith cells are connected. That is, the Tilby separation system is highly preferred for reasons relating to cutting of long fibers and consequent control of particle size at the early stages of flour making.

The Tilby system also serves to fracture the juice-bearing cells of such separated pith upon separation from rind. This serves to simplify sugar extraction to the extent desired and drying before grinding operations. Pith separated by the Tilby system is substantially free of rind and comprises about 8.5% fiber, about 14% sucrose and about 57% moisture along with other constituents. The sucrose content of such pith may be removed to the extent desired.

A suitable apparatus for adjusting the sugar content of milled pith as desired is disclosed in my copending, concurrently-filed United States patent application entitled "Improved Apparatus for Extraction of Juice from Sugarcane Pith." Such document is incorporated herein by reference. The amount of sugar removed is determined by a number of factors, including the number of extraction stations utilized, the amount of pressure applied, and the amount of leaching which may occur due to the presence of added water and the dwell-time in the operation.

After such selective adjustment of sugar content, the pith is passed through a de-watering station which reduces the moisture content to about 50% by weight. Following such de-watering, additional moisture is removed by passing the pith through a drier. Either a flash drier or a drum drier may be used for the purpose, although a flash drier may be somewhat more efficient. Such drying may reduce the moisture content of the pith to about 10-12% by weight.

Such dried pith is then processed by grinding it in a hammer mill which reduces the pith particle size from about 400-700 microns to about 100-200 microns, resulting in a powdery flour which is ready to use. A consequence of such hammer mill processing is that the moisture content is further reduced to about 7-9%.

Flour having some natural sugar content is suitable for making high fiber breads without the separate addition of sugar or at least as much sugar. Known bread recipes call for sugar as an ingredient since it is the bread constituent used with yeast to form carbon dioxide gas which makes bread "rise." For making such leavened bread, flour containing sugarcane flour may also include a grain flour which is preferably of the gluten-bearing type. As is known, wheat flour is the most common grain flour which contains gluten. Gluten gives the desired structure to bread dough to help capture carbon dioxide gas, thus giving such bread its light texture.

The flour of this invention is typically light or white in color even though having high fiber content. This allows use, for example, in a blend including wheat flour, for production of white bread which is high in fiber, a favorable alternative to other high-fiber breads which are not white.

A wide variety of flour blends may be "tailor-made" for very specific end uses. Most baking products contain at least some sugar, and the use of such sugarcane flour in these and other products can obviate the need for sugar (or as much sugar) as a separate ingredient. Also, blends can be made which provide other desirable baking qualities. For example, blend constituents can provide gluten helpful in making baked products which rise.

Cookie flours may have a very high level of natural cane sugar content and enough gluten content to provide some rising qualities. Cake flours may have a somewhat lower sugar content, with lower amounts of gluten. Cereal flours may have high dietary fiber content by having a relatively high amount of sugarcane flour in the blend.

The flour of this invention may be used in a variety of other products as well. Puddings, pie fillings, salad dressings and the like are thickened and contain at least some sugar. The use of such sugarcane flour in these and other products may obviate the need for sugar (or as much sugar) as a separate ingredient. The possibilities and advantages, including food industry uses other than baking goods, are endless.

Substantially rind-free sugarcane flour has value as a human foodstuff because of its high fiber content, regardless of the extent to which sugar content was removed in the manufacturing process. Benefits of a high-fiber diet are acknowledged by many and have been widely touted. Further, sugarcane flour naturally includes certain other elements such as nitrogen and potassium. Silica, sodium, calcium, magnesium and phosphate are also present in lesser amounts.

While the principles of this invention have been described in connection with specific embodiments, it should be understood clearly that these descriptions are made only by way of example and are not intended to limit the scope of the invention.

I claim:

1. A human dietary flour composition of substantially rind-free sugarcane made by the following steps in sequence:

providing sugarcane pith separated from other sugarcane constituents;

adjusting the sugar content of such pith to a desired level by extracting a portion of the sugar therefrom;

drying the pith; and grinding the dried pith to flour.

2. The flour composition of claim 1 further comprising grain flour.

3. The flour composition of claim 2 having at least 50% grain flour.

4. The flour composition of claim 3 having at least 80% grain flour.

5. The flour composition of claim 1 wherein the sugar content of such pith is substantially entirely removed.

6. The flour composition of claim 5 further comprising grain flour.

7. The flour composition of claim 6 having at least 50% grain flour.

8. The flour composition of claim 7 having at least 80% grain flour.

9. A method for making a human dietary flour composition comprising the following steps in sequence:

providing sugarcane pith separated from other sugarcane constituents;

adjusting the sugar content of such pith to a desired level by extracting a portion of the sugar therefrom;

drying the pith; and grinding the dried pith to flour;

thereby yielding substantially ring-free sugarcane flour.

10. The method of claim 9 including the further step of blending such rind-free sugarcane flour composition with grain flour.

11. The method of claim 9 wherein the adjusting step comprises removing substantially the entire sugar content of the pith.

12. The method of claim 11 including the further step of blending such rind-free sugarcane flour composition with grain flour.

* * * * *